United States Patent [19]

Woods et al.

[11] Patent Number: 5,076,607
[45] Date of Patent: Dec. 31, 1991

[54] HYBRID INFLATOR

[75] Inventors: Charles D. Woods, Gainesville; Donald W. Renfroe, Haymarket; James M. Rose, Fairfax; Teresa L. Bazel, Annadale, all of Va.; Richard L. Frantom, Richmond, Mich.; Robert J. Bishop, Washington, Mich.; Robert M. Kremer, Fraser, Mich.; Klaus F. Ocker, Fraser, Mich.

[73] Assignee: Bendix Atlantic Inflator Co., Troy, Mich.

[21] Appl. No.: 618,428

[22] Filed: Nov. 27, 1990

[51] Int. Cl.5 ............................................. B60R 21/26
[52] U.S. Cl. ........................................ 280/737; 222/5; 102/531
[58] Field of Search ............... 280/736, 737, 741, 728; 222/5; 137/68.2; 102/530, 531; 422/164, 165, 166

[56] References Cited

U.S. PATENT DOCUMENTS

| | | | |
|---|---|---|---|
| Re. 28,624 | 11/1975 | Lewis et al. | |
| 3,663,036 | 5/1972 | Johnson | 280/737 |
| 3,690,695 | 9/1972 | Jones | 102/531 |
| 3,723,205 | 3/1973 | Scheffee | |
| 3,741,580 | 6/1973 | Vos | 280/735 |
| 3,756,621 | 9/1973 | Lewis et al. | |
| 3,773,353 | 11/1973 | Trowbridge et al. | 280/737 |
| 3,774,807 | 11/1973 | Keathley et al. | 222/3 |
| 3,883,156 | 5/1975 | Frazier | |
| 3,895,821 | 7/1975 | Schotthoefer et al. | |
| 3,910,596 | 10/1975 | Wullbrecht et al. | 222/5 |
| 3,948,540 | 4/1976 | Meacham | 280/735 |
| 3,966,226 | 6/1976 | Roth | 280/737 |
| 3,972,545 | 8/1976 | Kirchoff et al. | 280/735 |
| 4,006,919 | 2/1977 | Neuman | 280/736 |
| 4,007,685 | 2/1977 | Nimylowycz | 102/530 |
| 4,018,457 | 4/1977 | Marlow | 280/735 |
| 4,021,058 | 5/1977 | Suzuki et al. | 280/737 |
| 4,136,894 | 1/1979 | Ono et al. | 280/740 |
| 4,203,616 | 5/1980 | Okada | 280/737 |
| 4,268,065 | 5/1981 | Granig | 280/737 |
| 4,358,998 | 11/1982 | Schneiter et al. | 280/741 |
| 4,619,285 | 10/1986 | Piet | 137/68.2 |
| 4,771,914 | 9/1988 | Kaneda et al. | 222/3 |
| 5,022,674 | 6/1991 | Frantom et al. | 280/737 |

Primary Examiner—Charles A. Marmor
Assistant Examiner—Karin Tyson

[57] ABSTRACT

An inflator (10) comprising: a pressure tank (12, 14, 16, 20) for storing a quantity of stored inflation gas under pressure. The pressure tank comprising a first burst disk (46) in communication with the stored inflation gas; a sliding piston (72) including at one end thereof a sharp edge (74) for puncturing the first rupture disk and at its other end a second rupture disk (80). The sliding piston (72) movable into engagement with the first rupture disk in response to the build up of pressure acting on the second rupture disk (80) in response to the burning of propellant material (90) thereby permitting egress of the stored inflation gas. The second burst disk being ruptured by the continued build up of pressure due to the burning propellant whereupon after the rupturing of same the heated products of combustion resulting from the burning propellant flow through the sliding piston (72) to increase the temperature of the stored inflation gas prior to its exit from the inflator.

16 Claims, 2 Drawing Sheets

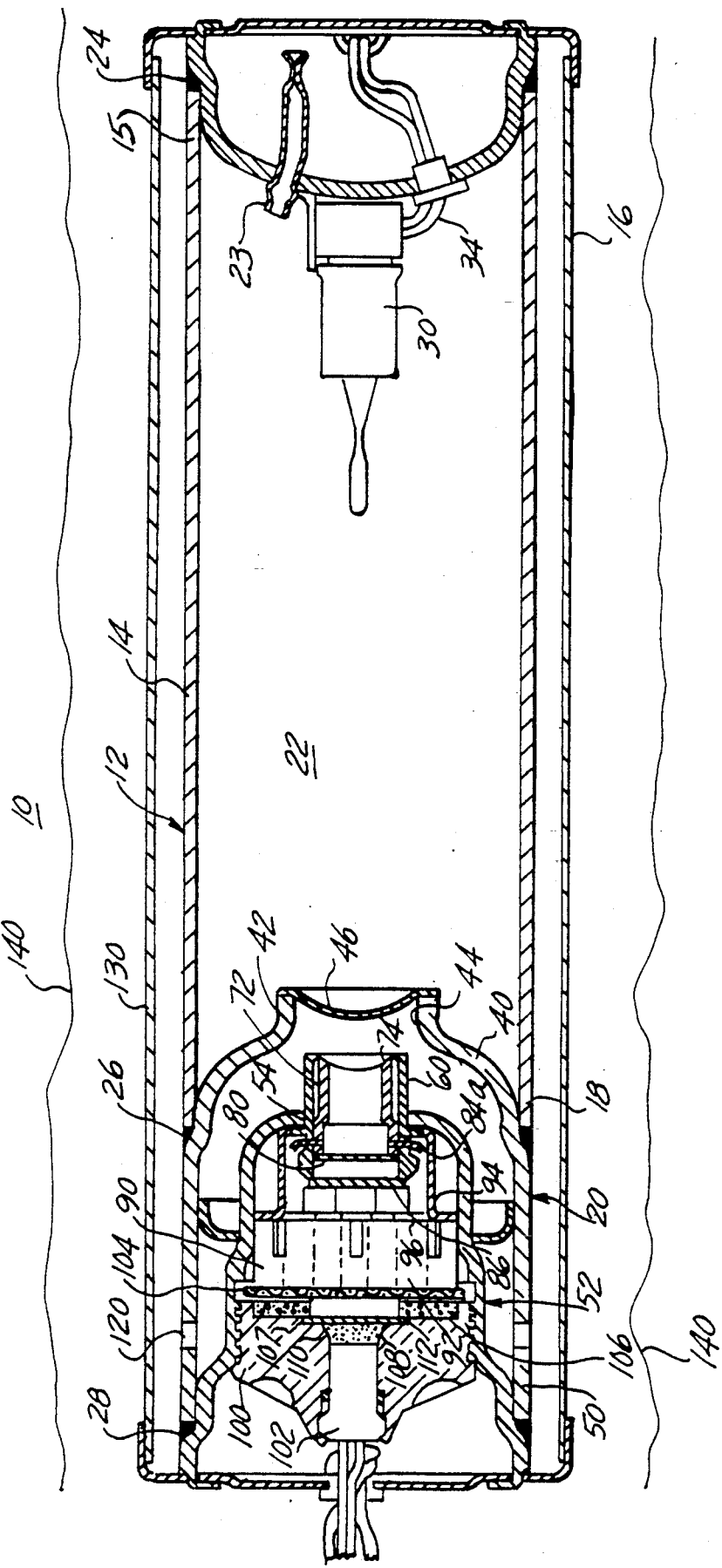

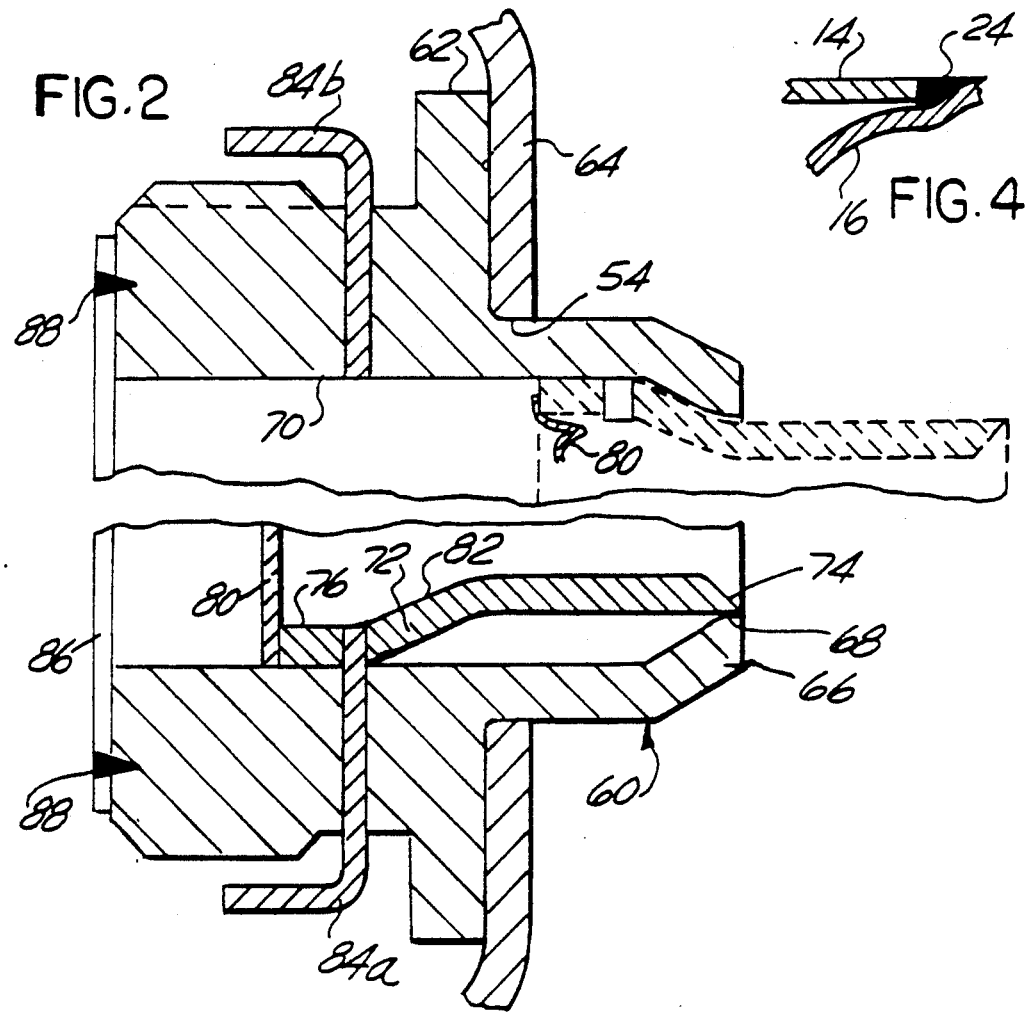
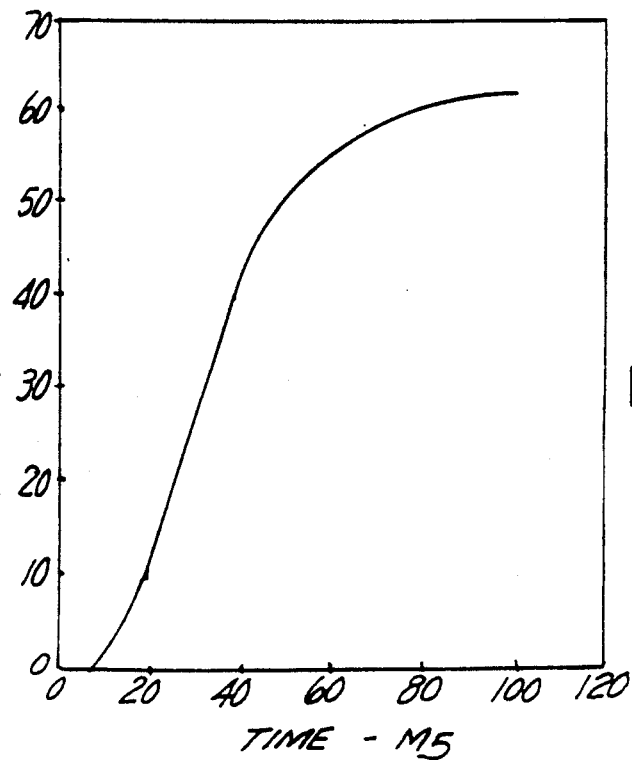

HYBRID INFLATOR

BACKGROUND AND SUMMARY THE INVENTION

The present invention generally relates to an inflator for an air bag or cushion and more specifically to the type of inflator known as a hybrid inflator.

It is known that if the early inflation rate of an air bag is too high, the resulting deployment forces can contribute to the possible injury of an occupant who is out of the normal seated (either driver or passenger) position. If, however, the air bag inflation rate is maintained at a relatively low value, primarily to reduce such deployment forces, full deployment of the air bag may not be timely achieved.

It has for some time been appreciated that one goal of air bag inflator design is to provide an inflator which initially has a relatively low or soft inflation rate (for a relatively few milliseconds) primarily to protect the out-of-position passenger, such as a standing child, who would be subject to large deployment forces and thereafter to rapidly increase the inflation rate of the air bag to cause rapid and full inflation. The prior art shows techniques for achieving this staged (bi-level) inflation of an air bag by utilizing an inflator which is capable of producing inflation gases with at least a low and a higher rate of gas production. With regard to air bag inflators generally, whether they are of the hybrid or stored gas variety or of the solid propellant (typically sodium azide) variety is the inclusion of an initiator or squib and a mass of gas producing or propellant material. As is known in the art and in response to a crash signal, the squib (or initiator) is activated which in turn causes the propellant material to burn. In the case of a hybrid inflator the purpose of the propellant material is to heat the stored inflation gas thereby increasing the effective, released volume of same while also increasing the rate of egress of the inflation gases from a pressure tank. In this case heated, stored gas is the primary source of inflation gases. In the solid propellant type of inflator, the squib causes the propellant to burn, the purpose of which is to generate a relatively inert, large volume of inflation gases.

In order to achieve the above-mentioned staged, variable inflation rate for an inflator, the prior art has proposed using a plurality of detonating devices to sequentially open restricted and unrestricted flow paths (see U.S. Pat. No. 3,741,580). Another type of device for generating the staged inflation has been proposed in U.S. Pat. No. 3,774,807, wherein upon activation of a single detonating element a piston moves to uncover a flow passage permitting the cold egress of stored gas from a pressure tank, thereafter the piston is used to detonate a quantity of propellant which in turn heats the stored gases prior to exiting the inflator. Instead of selectively opening a flow port as described above, U.S. Pat. No. 3,948,540 shows the technique of using a spear thrower mechanism which punctures a sheer disk to permit stored gas to flow through various exit ports and inflate the air bag. Still another technique to provide the staged inflation is to use a dual electro explosive device system wherein one detonator is used to rupture a disk which initially permits the stored gas to flow into the air bag and shortly thereafter to energize the second initiator which causes the propellant to burn and as such increases the rate at which gases exit the inflator. Of the patents illustrative of inflators using two or more electro explosive elements are U.S. Pat. Nos. 3,972,545; 4,007,685; 4,136,894; and 4,358,998. Additional patents which utilize variable orifice devices are U.S. Pat. Nos. 4,006,919; 4,018,457; 4,021,058; 4,203,616; 4,268,065 and 4,619,285. Other devices utilizing sliding members or disk piercing mechanisms are: U.S. Pat. Nos. 3,910,596; 3,948,540; 3,966,226; and 4,771,914.

It is an object of the present invention to provide an inflator for providing gases to inflate an air bag having a single electrically responsive squib and one primary quantity of propellant material in order to achieve a dual or staged inflation rate of the air bag.

Accordingly the invention comprises: an inflator comprising: a pressure tank for storing a quantity of stored inflation gas under pressure, the pressure tank comprising a first burst disk in communication with the stored inflation gas, a sliding piston including at one end thereof first means for puncturing the first rupture disk and at its other end a second rupture disk, the sliding piston movable into engagement with the first rupture disk in response to the build up of pressure acting on the second rupture disk in response to the burning of propellant material thereby permitting egress of the stored inflator gas. The second burst disk being ruptured by the continuing build up of pressure due to the burning propellant whereupon after the rupturing of same the heated products of combustion resulting from the burning propellant flow through the sliding piston to increase the temperature of the stored inflation gas prior to its exit from the inflator. As can be seen the invention provides a means for providing an inflator having a dual flow rate to first slowly and then more rapidly inflate an air bag.

Many other objects and purposes of the invention will be clear from the following detailed description of the drawings.

BRIEF DESCRIPTION OF THE DRAWINGS

In the drawings:

FIG. 1 illustrates a cross-sectional view of the present invention.

FIG. 2 illustrates an exploded view of a portion of FIG. 1.

FIG. 3 illustrates an alternate embodiment of the invention.

FIG. 4 illustrates an exploded view of a portion of FIG. 1.

FIG. 5 illustrates pressure-time profiles.

DETAILED DESCRIPTION OF THE DRAWINGS

With reference to FIG. 1 there is shown a hybrid inflator 10 for inflating an air cushion such as an air bag usable within a vehicle occupant safety restraint system. The inflator 10 comprises a pressure tank generally shown as 12. The pressure tank comprises three portions including a hollow cylindrical sleeve 14 secured at one end is to a first end cap 16. The sleeve is also secured at end 18 to another cylindrically shaped end cap 20. The pressurized tank 12, in the space shown as 22, is filled and pressurized with an inert gas such as Argon. This gas may be inserted and sealed within the pressure tank through a fill tube 23 of known design. The pressurized gas may also be a mixture of Argon and another inert gas such as helium. Typically the amount of helium is approximately two percent (2%) by volume of the amount of Argon gas. The purpose of using helium is to provide a means for detecting defects in any of the various weld joints such as 24, 26 or 28. FIG. 4 illustrates a typical weld joint 24. It can be seen that the sleeve 14 is spaced from the end cap 16 to permit the unrestricted migration of the stored gas to the weld joint so that any defects in such joint can be identified during the initial pressurization of the pressure tank 12. The test measures the presence of helium as known in the art.

An optional pressure sensor 30 may be secured to end cap 16. A seal such as a glass to metal seal is provided to seal an opening in the end cap 16 through which wires 34 associated with the pressure sensor are fed through. The end cap 20 includes a necked-down portion 40 facing the interior 22 of the pressure vessel. The end 42 of the end cap 20 is provided with an opening 44 which is closed by a rupturable, thin disk 46, preferably made of stainless steel, inconel or nickel. Secured to an end 50 of the end cap 20 is a gas generator housing generally shown as 52. The housing 52 extends partially within the end cap 20.

Positioned within an opening 54 within the housing 52 is a sleeve 60 which includes a flange 62 adjacent the forward portion 64 of the housing 52 (see FIG. 2). The sleeve 60 includes a narrow mouth portion 66 proximate an opening 68. Positioned within the bore 70 formed within the sleeve 60 is a sliding piston generally shown as 72. As can be seen from the drawings, the piston 72 is hollow and includes at a forward end thereof a cutting edge 74. Positioned at the rear end 76 of the piston 72 is another burst disk 80 of similar construction to burst disk 46. The burst disk 80 encloses the hollow bore or opening 82 defined by the walls of the piston 72. The sliding piston 72 is initially retained within the sleeve 60 by shear pins 84a and 84b. An alternate embodiment of the piston 72 having a pointed cutting edge 74'0 is shown in FIG. 3. In addition, FIG. 3 shows the burst disk 80 being formed as an integral part of the piston 72. An annular groove 78 may be formed on the rear face of the disk 80 to selectively weaken same.

The rear of the sleeve 60 may be partially covered by a restraining strap 86 which may be secured such as by welding at locations 88 to the sleeve 60. This restraining stap may be a thin, narrow band or alternatively, a wire. The purpose of the restraining strap 86 will be clear from the description below. If a band is used, it is contemplated that it could be fabricated of stainless steel having a thickness of 0.050 inches (1.27 mm) and a width of approximately 0.125 inches (3.175 mm).

Positioned within the housing 52, and rearward of the sleeve 60, is a quantity of propellant material 90 (see FIG. 1) such as Arcite disclosed in U.S. Pat. No. 3,723,205, which is incorporated herein by reference. As is known in the art, Arcite can be extruded to a shape conformal with the housing 52. Similarly, as known in the art, the molded propellant 90 may include a plurality of axially extending passages such as 92 to control the burn rate of the propellant material 90. The propellant 90 is supported within the propellant housing 52 by a metal retainer, 94 having a plurality of openings such as 96 coaxial with the openings 92 formed in the propellant 90.

An initiator housing 100 is secured to the propellant housing 52. Inserted within the initiator housing is an initiator or squib 102 of known variety which ignites in response to an electric control signal indicative of a crash situation. Squibs or initiators 102 or the like are well known in the art and are not described further herein.

Situated upstream of the ignitor 102 and within a small cavity 108 formed in the initiator housing 100 is a small quantity of ignition enhancing material 110 which may primarily consist of boron potassium nitrate. This ignition enhancing material may be sealed within the housing 100 by encapturing same by a thin metal foil layer 112.

Upon securement of the initiator housing 100 into the propellant housing 52, the propellant 90 is biased inwardly by action of a screen 104 which acts to uniformly distribute the heat, generated upon activation of the initiator 102, to the propellant 90. A sponge or spring element 106, preferably fabricated of a silicone sponge material, provides a modest preload on the propellant to maintain same in place. The resilient sponge element 106 includes an opening 107 so as not to interact with the flame produced by the squib 102.

The operation of the inflator 10 is as follows. The pressure tank 12 is initially filled to a pressure of between 2,000 and 4,000 psi with Argon/helium inflation gas, however, it has been found that an inflation pressure of approximately 3,000 psi is normal for the purpose of inflating many air bags. In this condition the burst disk 46 prevents egress of the inflation gases. In response to a signal indicative of a crash situation, the initiator 102 ignites thereby igniting the enhancing material 110 causing the propellant 90 to burn. As the propellant 90 burns, pressure is built up within the propellant housing 52 and acts on the rupture disk 80 secured to the sliding piston 72. This pressure which operates against the surface area of the burst disk 80 will build to a sufficient magnitude to create a force adequate to shear the shear pins 84a and b causing the sliding piston 72 to move within the sleeve 60 and puncture the burst disk 46. Upon puncturing the burst disk 46, the stored inflation gas immediately exits the orifice openings 120 in the end cap 20 and flows into a manifold 130 to inflate the air bag 140 which would typically be secured about the manifold in a known manner.

As can be appreciated, at this point in time the hot products of combustion resulting from the burning propellant have not yet mixed with the stored inflation gas and as such the puncturing of the burst disk 46 by the sliding piston 72 results in an initial, cold gas, gentle (low rate) deployment of the air bag as can be seen in the initial portions of the inflation time history as shown in FIG. 5. The pressure within the propellant housing 52 continues to rise as a result of the burning propellant 90 until a predetermined rupture pressure of the burst disk 80 is achieved. Typically this pressure could be approximately 5,000 psi. Subsequently, the hot gases generated by the propellant 90 are injected into the pressure tank 12 via the central bore 82 of the sliding piston 72. The injection of the hot propellant gases causes the gases exiting the orifice openings 120 in the end portion 40 of the pressure tank 12 to be heated, resulting in an increased rate of inflation of the air bag. This increased rate of inflation is also shown in FIG. 5. Reference is again made to FIG. 2, which shows the initial position of the piston 72 and also shows the stroked position of this piston (in phantom line). As previously mentioned, the sleeve 60 includes a narrowed portion 66 which upon movement of the piston 72 causes an interference fit with the piston 72 which serves to maintain the piston in its stroked position after it has opened the rupture disk 80. The restraining strap 86 (also shown in FIG. 2) provides a retainment for the sliding piston 72 in the event that it should stroke in reverse direction after first being exposed to the pressure of the stored Argon gas upon rupture of the burst disk 46.

As can be seen from the above, the present invention provides a methodology for providing the staged deployment of an air bag by selectively choosing the rupture pressure of the burst disk 80. The significance of this is that the inflator 10 provides for the slow, early onset of air bag deployment which results in lower air bag deployment forces which is significant in relation to out-of-position occupants. In addition, any deployment doors used to enclose the air bar, in its stored condition, would also be subjected to these lower deployment forces when they are opened, thereby providing for a more controlled opening of the deployment door. In addition, with regard to small vehicles which may be characterized by a severe crash pulse signature requiring the more rapid deployment of the air bag, it can be seen that the rupture pressure of the burst disk 80 which permits the communication of the heated propellant gases with the stored Argon gas can be chosen so that the time between the initial soft inflation of the air bag and the more rapid inflation of the air bag due to the communication of the heated propellant gases with the stored Argon gas occurs relatively shortly thereafter.

Many changes and modifications in the above described embodiment of the invention can, of course, be carried out without departing from the scope thereof. Accordingly, that scope is intended to be limited only by the scope of the appended claims.

We claim:

1. An inflator (10) comprising:
a pressure tank (12, 14, 16, 20) for storing a quantity of stored inflation gas under pressure, the pressure tank comprising a first burst disk (46) in communication with the store inflation gas and preventing egress of the gas from the chamber;
a sliding piston (72) having an opening and including at one end thereof first means (74) for puncturing the first burst disk (46) and at its other end a second burst disk (80); and
a propellant material (90) provided near the second burst disk (80), said propellant producing gaseous combustion products when burned;
the sliding piston (72) movable into engagement with the first burst disk to puncture said first burst disk in response to the build up of pressure acting on the second burst (80) in response to burning of the propellant material (90) thereby permitting egress of the stored inflation gas, the second burst disk being ruptured by the continued build up of pressure due to the burning propellant material whereupon after the rupturing of the second burst disk the heated products of combustion resulting from the burning propellant material flow through the opening of the sliding piston (72) to increase the temperature of the stored inflation gas prior to its exit from the inflator.

2. The inflator (10) as defined in claim 1 wherein the pressure tank (12) comprises a cylindrical sleeve (14), a first end cap (16) secured at one end (14) thereof and a second end cap (20) secured at another end (18) thereof, the second end cap (20) being of generally cylindrical shape and including a narrowed portion (40) extending into the sleeve (14), the narrowed portion defining a first opening (44), the first burst disk (46) being secured to the narrow portion to close the first opening (44), the second end cap (20) further including at lease one orifice opening (120) through which gases escape upon the puncturing of the first burst disk (46).

3. The inflator (10) as defined in claim 1 wherein the first end cap (16) supports a pressure sensor (30) positioned interior to the pressure tank (12).

4. The inflator as defined in claim 1 wherein a propellant housing (52) is positioned within, secured to and generally spaced from the interior of the second end cap (20), the housing (52) including a second opening (54) facing the first burst disk (46),
a hollow sleeve member (60) is secured to the housing (52) and extends through the second opening (54), the sliding piston (72) is received and movable within the sleeve member (60).

5. The inflator (10) as defined in claim 4 including first means (84) for restraining the motion of the sliding piston (72) in a direction toward the first burst disk (46), the first means restraining the movement of the sliding piston (72) until the pressure generated by the burning propellant has reached a first predetermined value.

6. The inflator (10) as defined in claim 5 wherein the sleeve member (60) includes at an end facing away from the first burst disk (46), second means (86) for preventing the sliding piston from moving in a direction toward the propellant housing (52).

7. The inflator (10) as defined in claim 6 wherein the second means (86) includes a narrow band or wire.

8. The inflator (10) as defined in claim 4 wherein the propellant material (90) is secured within the propellant housing (52) spaced from the sliding piston (72), an initiator means (100, 102) responsive to a control signal indicative of a crash situation, generating heat to cause the propellant to burn, bias means (104, 106) interposing the initiator means and propellant material (90) for preloading the propellant material to prevent movement of same.

9. The inflator (10) as defined in claim 8 wherein the bias means (104, 106) comprises a screen (104) in contact with the propellant material (90) the screen (104) functions as a means of uniformly distributing the heat generated by the initiator means to the propellant.

10. The inflator (10) as defined in claim 8 wherein the bias means further includes a resilient material which preloads the screen (104) onto the propellant material.

11. The inflator (10) as defined in claim 1 wherein a diffuser (130) is positioned about the inflator to distribute gas of inflation to an air bag (140), such air bag mounted about the diffuser (130).

12. The inflator (10) as defined in claim 8 wherein the initiator means includes an initiator housing (100) secured to the propellant housing (52) and a squib or initiator (102) for initiating the burning of the propellant material, and ignition enhancing means (110) positioned between the squib and the propellant material (90) for increasing the heat supplied to the propellant material (90).

13. The inflator (10) as defined in claim 4 wherein the sleeve member (60) includes means for retaining the sliding piston (72) in its burst disk piercing position.

14. The inflator (10) as defined in claim 13 wherein the last mentioned means includes means for creating an interference fit between the sleeve member (60) and sliding piston (72).

15. The inflator (10) as defined in claim 1 wherein the second burst disk (80) is formed as an integral part of the sliding piston (72).

16. The inflator (10) as defined in claim 10 wherein the resilient material is silicone.

* * * * *